J. A. St. John.

Harvester Rake.

No 1104 Reissued Dec. 18, 1860.

Witnesses,
S. Cohen
J. Hirsh

Dayton S. Morgan
By atty A. B. Stoughton

UNITED STATES PATENT OFFICE.

J. A. ST. JOHN, OF JANESVILLE, WISCONSIN, ASSIGNOR, BY MESNE ASSIGNMENTS, TO W. H. SEYMOUR, D. S. MORGAN, S. G. WILLIAMS, AND A. PALMER, OF BROCKPORT, NEW YORK.

IMPROVEMENT IN RAKING ATTACHMENTS TO HARVESTERS.

Specification forming part of Letters Patent No. 20,378, dated May 25, 1858; Reissue No. 1,104, dated December 18, 1860.

*To all whom it may concern:*

Be it known that J. A. ST. JOHN, of Janesville, in the county of Rock and State of Wisconsin, did invent certain new and useful Improvements in Raking Attachments to Harvesters; and I do hereby declare that the following is a full, clear, and exact description of the same, reference being had to the accompanying drawings, making a part of this specification, in which—

Figure 1:
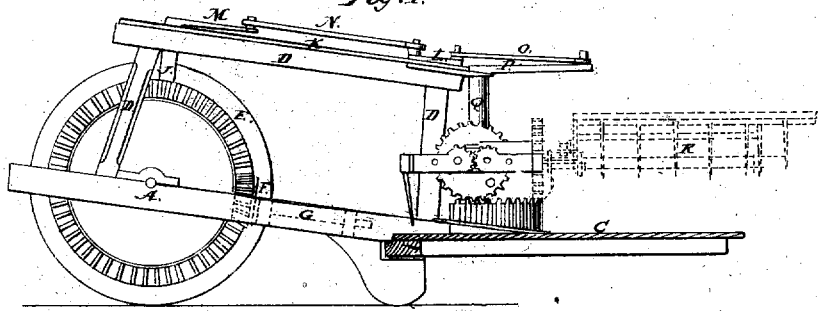
Figure 2:
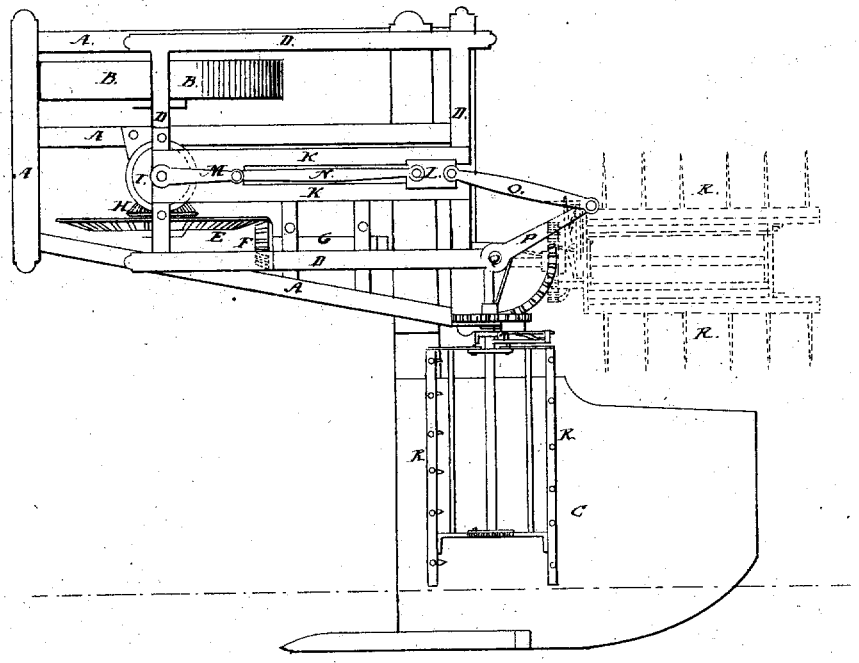

Figure 1 represents a sectional side view of a harvester with the raking attachment applied to it. Fig. 2 represents a top plan view of the machine and raking attachment.

Similar letters of reference, where they occur in the separate figures, denote like parts of the machine in both of the figures.

The invention of the said ST. JOHN consists in the mechanism interposed between the crank near the drive-wheel and the crank near the rake for the purpose of transmitting motion from the drive-wheel to the rake, said mechanism consisting substantially of a slide moving on guides and two pitmen or connecting-rods.

To enable others skilled in the art to make and use said invention, I will proceed to describe the same with reference to the drawings and letters of reference thereon.

A represents a main frame, supported on a carrying and driving wheel, B. C is the grain table or platform, projecting from the side and rear of the main frame, and D is an auxiliary frame, supported on or carried by the main frame A. The axle of the drive-wheel A turns with the wheel, and upon it is placed a bevel-gear wheel, E, that turns a bevel-pinion, F, on a shaft, G, said shaft having upon it a crank to which the cutter-bar may be connected, and by which it may be driven. On the main-wheel axle there is also a bevel-pinion, H, that gears with and turns another bevel-pinion, I, that is on a vertically-placed shaft, J. On the frame D there are ways or guides K K, extending from front to rear of said frame in direction, and upon these ways a slide, L, moves as follows: To the upper end of the shafts there is connected a crank, M, which, by means of the connecting-rod N, is attached to the slide L, and by this connection the slide is moved back and forth on its ways or guides K K. To the slide L is attached, by one of its ends, a second connecting-rod, O, which rod, at its opposite end, is attached to the wrist-pin of a crank, P, that is secured to a shaft, Q, that operates the raking devices, and which causes the rake to move over the platform or grain-table at regular intervals, clearing it of the cut grain and delivering it in a compact gavel on the ground behind the machine. The particular advantage of the two cranks, two connecting-rods, and slide, as a mechanical means of transmitting motion from the main drive-wheel to the rake, is this, that the drive-wheel may be in front and the grain-table, over which the rake works, in rear and to one side of the main frame, and yet, without any cramping of the mechanism, said rake may be freely and easily operated. So, too, of any other locality of drive-wheel and grain-table in relation to the main frame, for the slide and two connecting-rods will transmit motion from the main drive-wheel to the rake, however they may be located in relation to each other and to the main frame; but it is particularly applicable to machines where the grain-table is at or near the rear of the main frame, and to one side of it, which is the present most common construction.

The rake R, herein represented, moves in the arc of a circle over the platform, and has a rising-and-falling motion to prevent it from interfering with the falling grain.

Having thus fully described the nature and object of the invention, what is claimed therein as the invention of the said J. A. ST. JOHN, and desired to be secured by Letters Patent, is—

The use of two pitmen and a slide interposed between the main driving-gear and the rake shank or shaft for the purpose of transmitting motion to the rake from the driving-power, substantially as herein described.

D. S. MORGAN.

Witnesses:
A. B. STOUGHTON,
E. COHEN.